United States Patent [19]
Wohlers

[11] 4,210,910
[45] Jul. 1, 1980

[54] DECODER FOR A SPACE RETRODIRECTIVE ARRAY

[75] Inventor: Robert J. Wohlers, Orchard Park, N.Y.

[73] Assignee: Calspan Corporation, Buffalo, N.Y.

[21] Appl. No.: 3,443

[22] Filed: Jan. 15, 1979

[51] Int. Cl.² .............................................. G01S 7/02
[52] U.S. Cl. ................................. 343/7.6; 343/6.5 LC
[58] Field of Search ................. 343/6.5 R, 6.5 LC, 7.6

[56] References Cited
U.S. PATENT DOCUMENTS 4,151,524  4/1979  Caputi, Jr. ........................ 343/6.5 R
4,155,087  5/1979  Okrent .................................. 343/7.6

Primary Examiner—T. H. Tubbesing
Attorney, Agent, or Firm—Allen J. Jaffe; David J. Zobkiw

[57] ABSTRACT

A modulating signal which is selectively changed as a function of time is applied to the modulating diodes of a retrodirective array. The diodes modulate the signal reflected from the array. A decoder coacting with the illuminating radar can extract information from the time-frequency code superimposed on the return signal to thereby identify the target.

5 Claims, 5 Drawing Figures

DECODER FOR A SPACE RETRODIRECTIVE ARRAY

When the circular retrodirective array which is the subject matter of U.S. Pat. No. 3,958,246 is employed in its passive beacon application, an electrical signal is required to be applied to the modulating diodes of the array. The diodes modulate the signal reflected from the array, thus generating side-bands separated from the frequency of the illuminating signal by an amount equal to the frequency of the applied modulating signal. By selectively changing the frequency of the modulation as a function of time, as taught is commonly assigned copending U.S. Application Ser. No. 964,308 filed Nov. 28, 1978 which is a continuation of Ser. No. 821,125 filed Aug. 2, 1977, now abandoned, a time-frequency code can be generated that contains identity information that can be deciphered by the decoder of the present invention coacting with the illuminating radar.

The signal developed by the retrodirective array in its passive beacon mode is a time-frequency code. However, in order to successfully identify the signal as arising from the array, the code must be deciphered with a great deal of accuracy. That is, a high probability of successful decoding must be coupled with a low false alarm rate.

It is an object of this invention to provide a decoder for use with the retrodirective array which is the subject matter of U.S. Pat. No. 3,958,246.

It is a further object of this invention to provide a decoder for accurately deciphering information contained in a time-frequency code.

It is an additional object of this invention to provide a decoder for use in conjunction with the encoder which is the subject matter of U.S. Application Ser. No. 964,308. These objects and others as will become apparent hereinafter, are accomplished by the present invention.

Basically, the returned signal containing a superimposed time-frequency identity/information code is processed to identify the frequencies/channels used in the code. The channels are separated, sampled in sequence and processed to obtain the information contained therein.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENT

Figure 1:
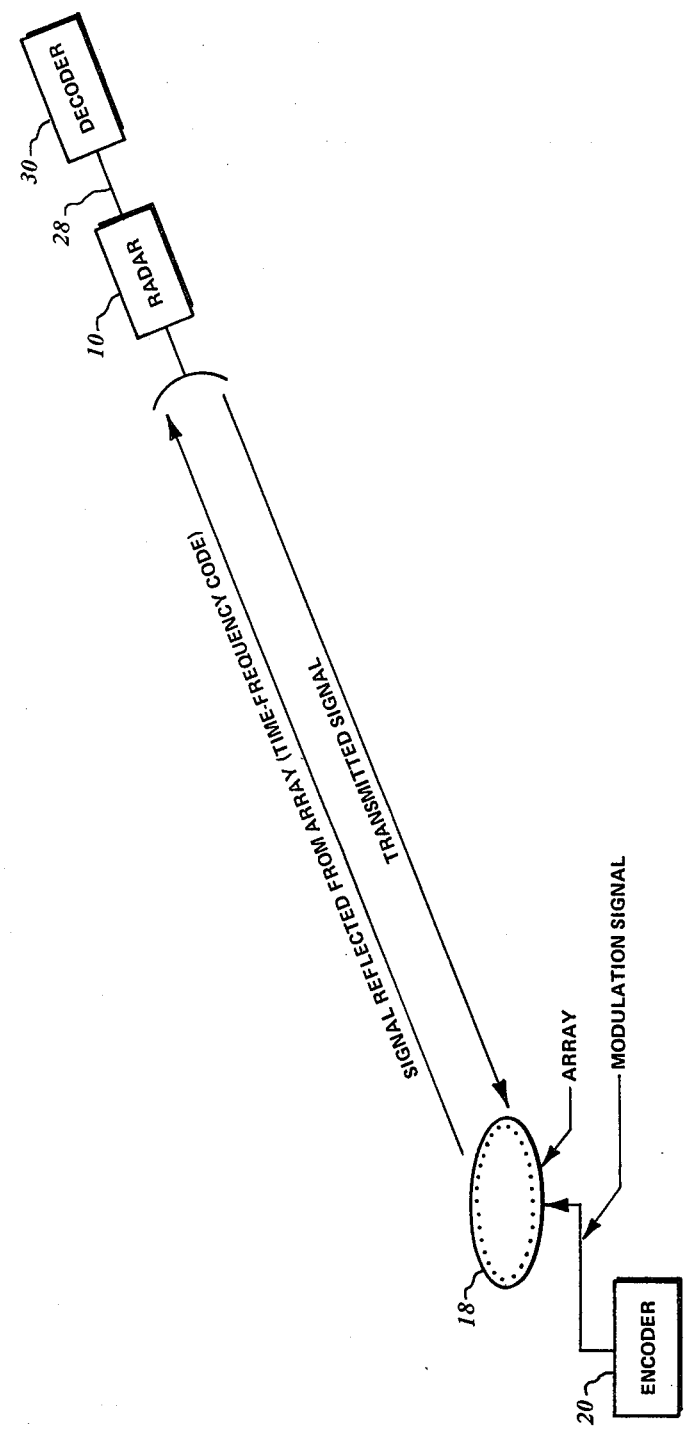
FIG. 1 is a schematic representation of the use of the present invention in a retrodirective array system.

Referring to FIG. 1, the radar unit 10 transmits a signal which is received by the retrodirective array 18 which functions as a passive beacon. As described in detail in U.S. Pat. No. 3,958,246, the array 18 includes a lens having a plurality of diametrically located pairs of array elements made up of atenna elements and probes located circumferentially about the lens. When the signal transmitted by radar unit 10 reaches the retrodirective array 18, RF energy from the signal is absorbed by each of the antenna elements and is coupled by the probes to the lens. The action of the lens is to direct the RF energy received by any probe to the diametrically located probe. This RF energy is then re-radiated by the antenna element connected to that probe. The signal re-radiated by any one of the array elements is accomplished according to the antenna pattern of the element. The action of the signals re-radiated by all of the elements acting simultaneously is to form an antenna pattern maximum back in the direction of the incident plane wave. In order to separate the signal reflected from the array 18 from the illuminating signal, a signal is applied to the modulating diodes of the array. The diodes modulate the signal reflected from the array, thus generating side-bands separated from the frequency of the illuminating signal by an amount equal to the frequency of the applied modulating signal. The encoder 20, which is described in detail in U.S. Application Ser. No. 964,308, selectively changes the frequency of the modulating signal as a function of time and thereby generates a selective time-frequency code that contains identity information, location information, etc. that can be deciphered by the decoder 30 which is operatively connected to radar unit 10 via line 28.

Figure 2:
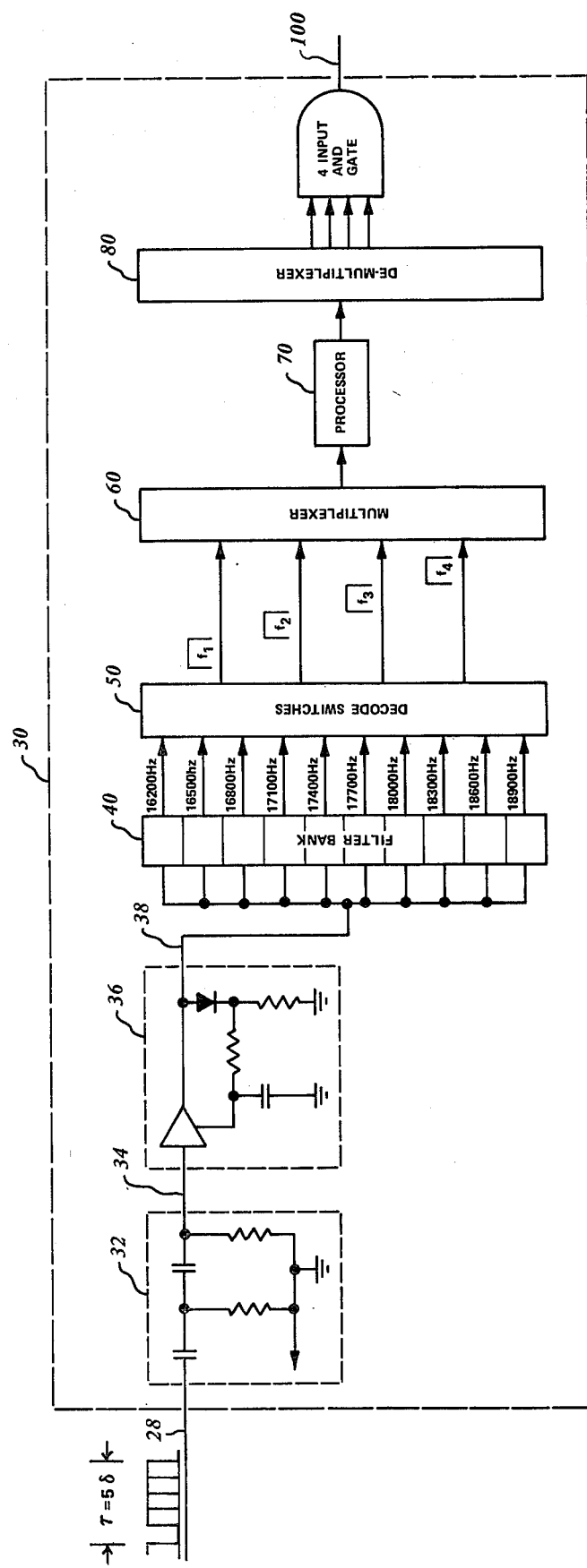
FIG. 2 is a simplified block diagram of the decoder.

As best shown in FIG. 2, an input signal containing a superimposed time-frequency code is supplied to decoder 30 from radar unit 10 via line 28 and represents the return signal from array 18. In the return signal, the time width of each time slot is $\delta$ and, for the illustrated four channel example, the total pulse width, $\tau$, is equal to $5\delta$ in order to provide a "blank" between pulses. The signal is supplied to high pass filter 32 which has a 3 db point at 12 KHz and the signal is then supplied via line 34 to automatic gain control (AGC) amplifier 36. The output of AGC amplifier 36 has 1 volt RMS on the noise of the signal which is then supplied via line 38 to filter bank 40. The acceptance band or filter bandwidth of high pass filter 32 is sufficient to accept all possible frequencies in the code group. The purpose of AGC amplifier 36 is to establish a given level based on thermal noise.

Filter bank 40 is made up of a number of passband filters. In the illustrated example, filter bank 40 is made up of ten passband filters each of 75 Hz bandwidth and separated by 300 Hz. The specific number of passband filters will be determined by the intended use of the decoder 30. The outputs of each of the passband filters making up filter bank 40 are supplied to each of the thumbwheel switches making up decode switches 50. The number of thumbwheel switches will be equal to the number of time slots containing a signal that are used in the time-frequency code. Since four time slots, $f_1$-$f_4$, are present in the exemplary signal supplied to line 28, a corresponding number of thumbwheel switches will make up decode switches 50. The output of decode switches 50 is fed via four identical channels into multiplexer 60. The outputs of the four channels are sampled in sequence by the multiplexer 60 and supplied to processor 70 as a single input. If a detection is made in the processor 70, the output of processor 79 is supplied to demultiplexer 80 where each signal is sorted back to an individual channel and restored to a proper pulsewidth. The four channels defining the output of demultiplexer 80 are supplied as the input of 4-input AND gate 90. AND gate 90 compares the four inputs with the requirement that all be present before a detection is noted and supplied as an output at line 100.

Figure 3:
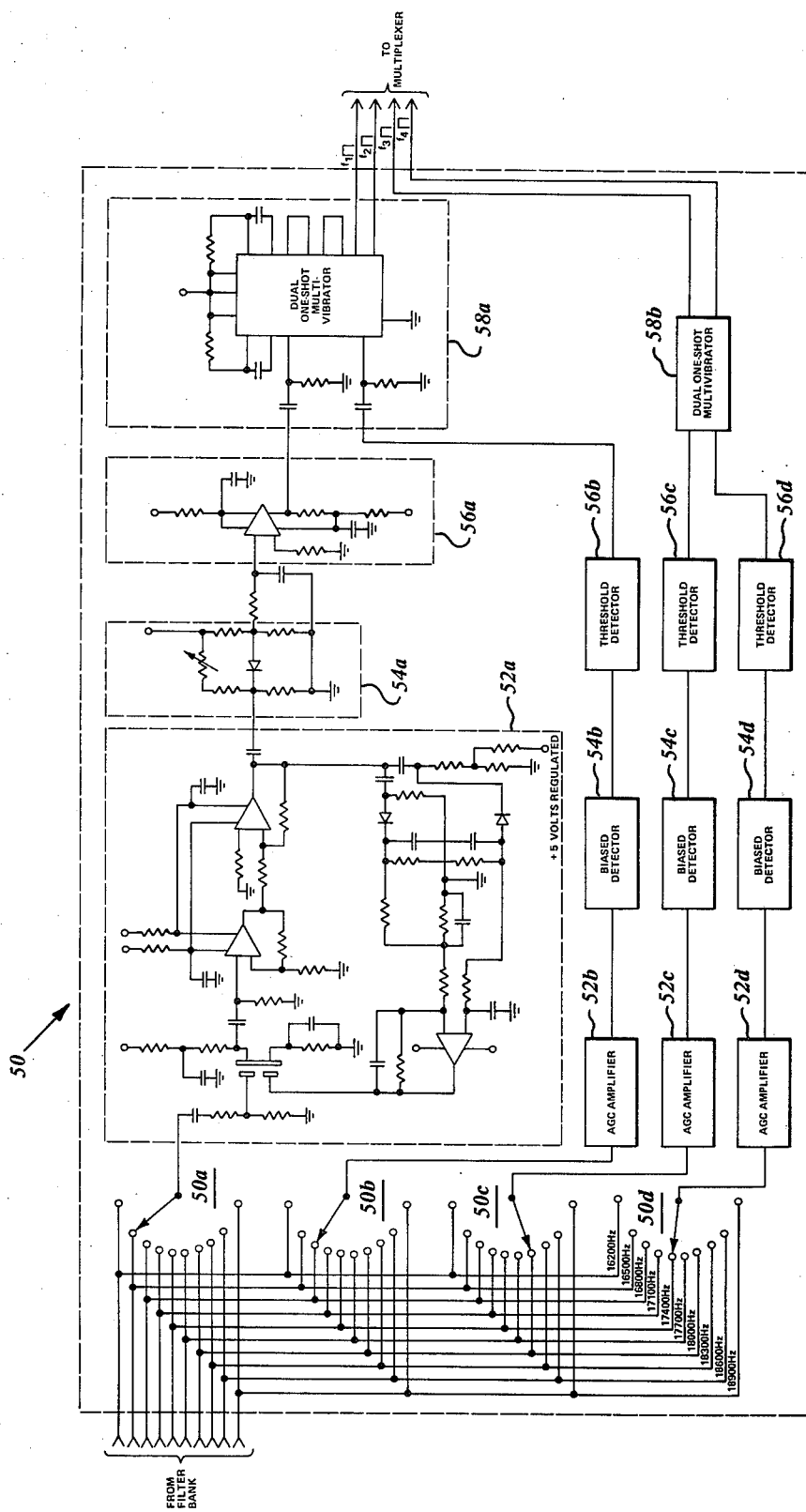
FIG. 3 is a circuit diagram of the decode switches.

Referring now to FIG. 3, for the four time slots indicated as present in the signal supplied to line 28, a corresponding number of thumbwheel switches, 50a–d, will be present in decode switches 50. The thumbwheel switches 50a–d, connect the outputs of the ten passband filters making up filter bank 40 to a number of individual channels. Each channel corresponds to a particular time position in the time-frequency code group and the number of channels employed will correspond to the number of time slots in the code. The output from each thumbwheel switch, 50a–d, then feeds another AGC amplifier 52a–d, respectively. AGC amplifiers 52a–d compensate for different losses that may be encountered with different filters. For example, the filter at 16,200 Hz of the illustrated example may not have the same transmission loss at center frequency as the loss encountered at the center frequency of the filter at 16,500 Hz. By virtue of the illustrated diode arrangement, AGC amplifiers 52a–d do not exhibit a linear characteristic with signal level, but one with a "break". This arrangement is employed to prevent the AGC amplifiers 52a–d from acting on signal, but rather on thermal noise. The duty cycle of the signal will usually be small compared to noise.

Figure 4:
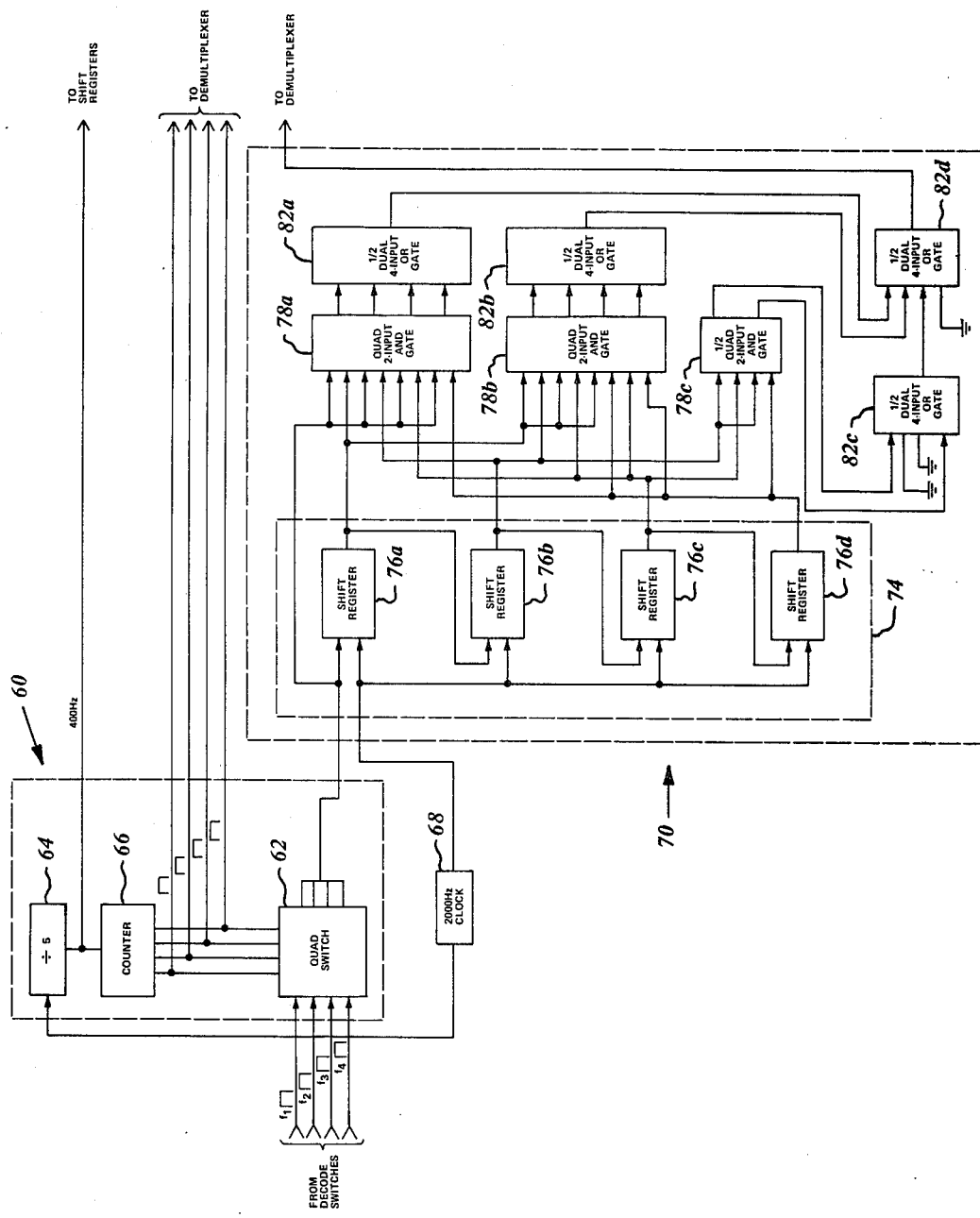
FIG. 4 is a circuit diagram of the multiplexer and processor.
Figure 5:
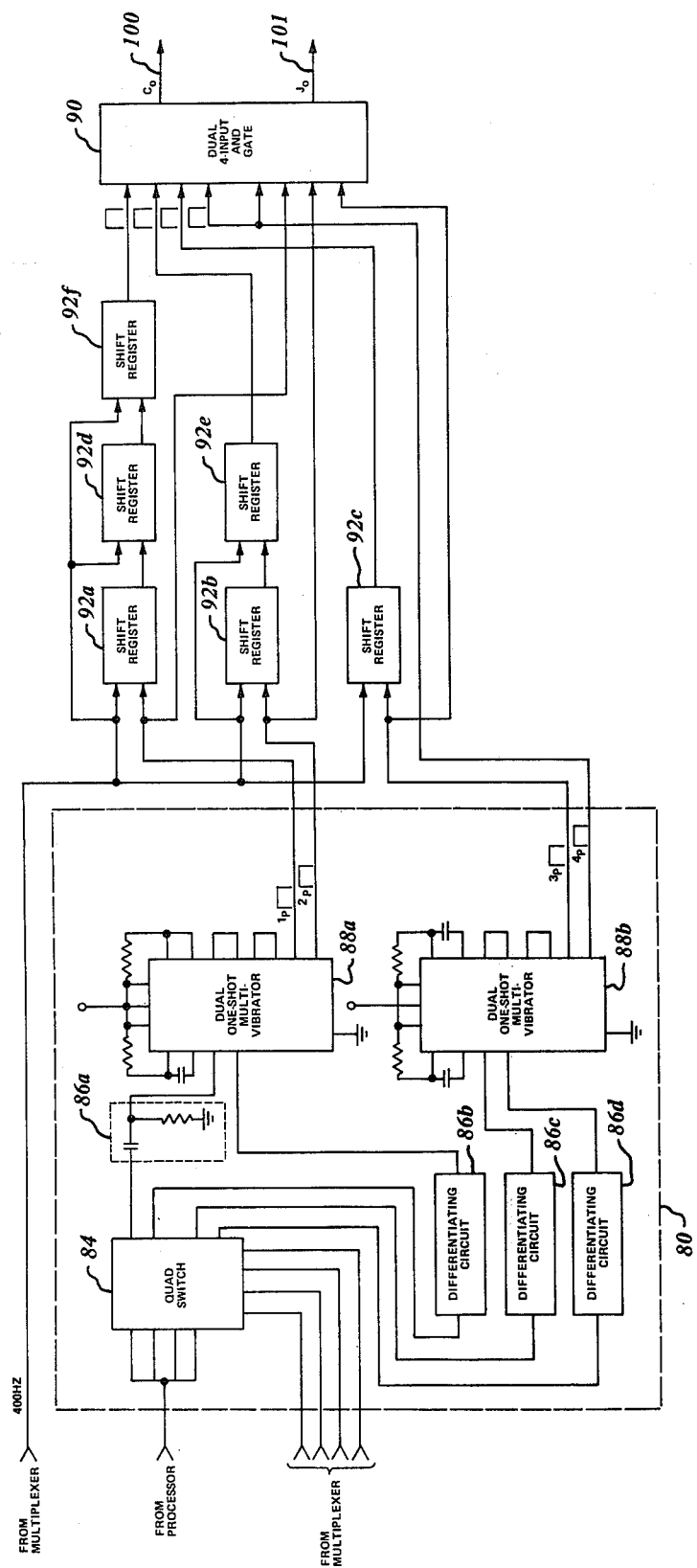
FIG. 5 is a circuit diagram of the de-multiplexer and AND gate.

Following AGC amplifiers 52a–d are biased detectors 54a–d and threshold detectors 56a–d, respectively. In combination, these components will suppress thermal noise effects, yet generate a signal whenever signal plus noise exceeds a given threshold. Threshold detectors 56a–d each yield a pulse output whose width is proportional to the time the signal exceeds the threshold. Since subsequent processing requires a pulse of fairly stable width, the output of each of the threshold detectors 56a–d is differentiated and fed into dual one-shot multivibrators 58a and b, respectively. Here in the illustrated example, the output pulse is held at 0.02 seconds. As best shown in FIG. 4, the outputs of multivibrators 58a and b are fed into quad switch 62 of multiplexer 60. The 2000 Hz clock 68 sends a 2000 Hz timing signal to divider 64 of multiplexer 60. Divider 64 in turn divides the 2000 Hz signal by five and supplies a 400 Hz timing signal to counter 66 of multiplexer 60. Counter 66 supplies a control signal to quad switch 62 whereby quad switch 62 samples each channel output in sequence. Since each sample does not appear simultaneously at the output of quad switch 62, the outputs can be added, as shown, and processed in a single M out of N detector 74 which is a part of processor 70. M out of N detector 74 is in the form of a tapped delay line connected to quad switch 62 and 2000 Hz clock 68 and is provided with an overall delay of $(N-1)\tau$, where $\tau$ is the repetition period of the signal and N is the number to be sampled. By interconnecting the taps of shift registers 76a–d (there is a delay of $\tau$ between taps) as shown in FIG. 4, a requirement is set up that at least M signals must exceed the threshold out of the set N before an overall detection is made. In the case illustrated it is for two coincidences in a set of five and it will be noted that the multiplexing operation allows time sharing of processor 70. Quad 2-input AND gates 78a and b and ½ quad 2-input AND gate 78c are connected to taps of shift registers or delay lines 76a–d of detector 74 and to ½ dual 4-input OR gates 82a–c as illustrated. The outputs of gates 82a–c are supplied as inputs to ½ dual 4-input OR gate 82d. The output of gate 82d together with control signals from counter 66 of multiplexer 60 are supplied as inputs to quad switch 84 of de-multiplexer 80 as shown in FIG. 5. The outputs of quad switch 84 are supplied to differentiating circuits 86a–d, where a leading edge trigger is developed. These trigger signals, in turn, are supplied to dual one-shot multivibrators 88a and b, as illustrated, with each multivibrator producing pulses of 0.02 seconds width. Thus each signal is sorted back to an individual channel while its pulse width has been restored to its original 0.02 second width.

Since channel 1, $1_p$ should occur first, channel 2, $2_p$, second, channel 3, $3_p$, third and channel 4, $4_p$, last, proper decoding requires this sequence. Thus, the channel 1 signal is delayed by $[K-1]\delta$, where K is the number of time slots in the code and $\delta$ is the time width of the slot. Similarly, channel 2 signal is delayed by $[K-2]\delta$, etc. As a result, the outputs of one-shot multivibrators 88a and b are supplied to shift registers or delay lines 92a–c as well as to one half of dual 4-input AND gate 90. A 400 Hz timing signal is supplied by divider 64 of multiplexer 60 to shift registers or delay lines 92a–f. In the illustrated example, the delayed outputs of shift registers 92c, e and f together with an output of one-shot multivibrator 88b are supplied as inputs to the other half of dual 4-input AND gate 90 where all outputs are compared, with the requirement that all be present simultaneously before a detection is noted. The action of the shift registers 92a–f is to delay signals in the various channels to achieve such time coincidence only with a proper time sequence on the input. Output line 100 thus yields a signal, $C_o$, that indicates whether or not a proper code is being detected.

An examination of the delay line detection process shows that it would be possible to obtain a false detection if a signal existed in all four channels simultaneously. To overcome this, a comparison is made of the signals in the four channels prior to delay line sorting. The outputs of dual one-shot multivibrators 88a and b are therefore fed into half of dual 4-input AND gate 90 for comparison. If signals exist simultaneously at the outputs of multivibrators 88a and b, detection by half of dual 4-input AND gate 90 yields an output signal, $J_o$, on line 101 that indicates that a false code is present.

Although a four channel decoder has been illustrated and described, other numbers of channels and different frequencies may be employed. Since these and other changes will occur to those skilled in the art, it is therefore intended that the scope of the present invention is to be limited only by the scope of the appended claims.

I claim:

1. A method for extracting information contained in a time-frequency code superimposed on radar signals of an inquiry radar including the steps of:
    receiving radar return signals containing a time-frequency code;
    separating the received radar return signals into their component bands;
    determining the presence of a predetermined number of component bands in a predetermined range of frequencies; and
    producing an output containing the extracted time-frequency code when a predetermined number of channels are present in the received signal.

2. A method for extracting information contained in a time-frequency code superimposed on radar return signals of an inquiry radar including the serial steps of:
    filtering radar return signals so as to only pass signals within a predetermined range of frequencies;

amplifying the passed signals to a predetermined level;

filtering said amplified signals to separate the passed signals into their component bands;

decoding the separated signals to identify the component bands present;

sampling in sequence the component bands present and producing a signal containing each of the component bands;

processing the sampled signal to determine the presence of a predetermined number of bands and when present passing the processed signal;

sorting the processed signal into individual channels of the proper pulse width; and producing an output containing the extracted time-frequency code when a predetermined number of channels are present in the sorted signal.

3. Apparatus for extracting information contained in a time-frequency code superimposed on radar signals of an inquiry radar including:

means for receiving radar return signals containing a time-frequency code;

means for separating the received radar return signals into their component bands;

means for determining the presence of a predetermined number of component bands in a predetermined range of frequencies; and means for producing an output containing the extracted time-frequency code when a predetermined number of channels are present in the received signal.

4. Apparatus for extracting information contained in a time-frequency code superimposed on radar return signals of an inquiry radar including:

means for filtering radar return signals so as to only pass signals within a predetermined range of frequencies;

means for amplifying the passed signals to a predetermined level;

means for filtering said amplified signals to separate the passed signals into their component bands;

means for decoding the separated signals to identify the component bands present;

means for sampling in sequence the component bands present and producing a signal containing each of the component bands;

means for processing the sampled signal to determine the presence of a predetermined number of bands and when present passing the processed signal;

means for sorting the processed signal into individual channels of the proper pulse width; and means for producing an output containing the extracted time-frequency code when a predetermined number of channels are present in the sorted signal.

5. A decoder for use in combination with an inquiry radar system to extract information contained in a time-frequency code superimposed on the radar return signals and including:

first filter means for only passing the portion of a radar return signal within a predetermined range of frequencies;

amplifier means for amplifying the passed radar return signal to a predetermined level;

second filter means for only passing the amplified radar return signal within predetermined bands in said predetermined range of frequencies;

decoding means including a number of switches equal to the number of time slots present in the radar return signal for producing each superimposed frequency present in the radar return signal as an output;

multiplexer means for sampling each of the outputs of the decoding means in sequence and for producing an output containing all of the frequencies present;

processor means for testing the output of the multiplexer means for the presence of a predetermined number of frequencies and if the predetermined number of frequencies is present, for producing an output containing all of the frequencies present;

means for sorting the output of the processor means into individual component channels of proper pulse width; and means for producing an output containing the extracted information contained in the time-frequency code when a predetermined number of channels are present in the sorted output.

* * * * *